Aug. 1, 1933.  G. P. SCHWABACHER  1,920,811
OUTLET BOX
Filed Oct. 26, 1931

Inventor:
Gerhard P. Schwabacher,
by Charles V. Tullar
His Attorney.

Patented Aug. 1, 1933

1,920,811

UNITED STATES PATENT OFFICE 1,920,811

OUTLET BOX

Gerhard P. Schwabacher, Bridgeport, Conn., assignor to General Electric Company, a Corporation of New York Application October 26, 1931. Serial No. 571,072

3 Claims. (Cl. 247—15)

My invention relates to outlet boxes and more specifically to outlet boxes with partitions for separating them into two compartments for the accommodation of two different circuits.

An object of my invention is to provide a partition rigidly supported in an outlet box which will completely separate the outlet box into two separate compartments without communicating passages and which will be adaptable for use with boxes of different depths. A further object of my invention is to provide a partition which will be of simple construction, of low cost of manufacture and easy to install.

What I consider to be novel and my invention will be better understood by reference to the following specification and appended claims.

Figure 1:
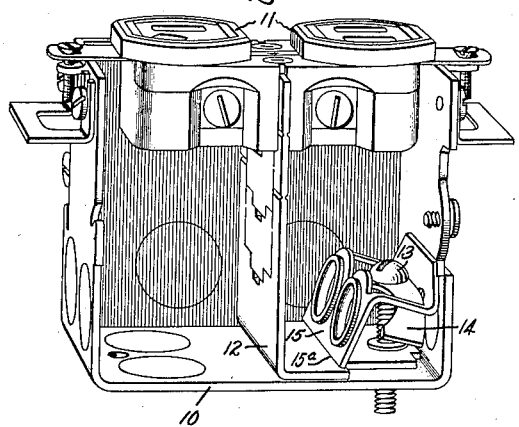
Figure 2:
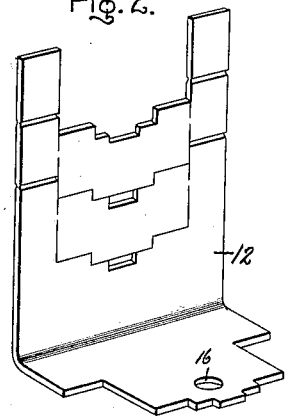

In the accompanying drawing Fig. 1 is a perspective view of an outlet box with one wall removed to expose the partition mounted in position, and Fig. 2 is a perspective view of the partition.

Referring to the drawing, Fig. 1, 10 indicates an outlet box with a double convenience outlet 11 mounted in position. The two outlets of the double convenience outlet 11 are adapted to be connected to different circuits. For separating these two circuits within the outlet box a partition 12 is provided. This partition extends from side to side of the box and from the bottom of the convenience outlet to the bottom of the box and so divides the space within the box for the storage of the electric conductors in two separate compartments without communicating passages. The partition is rigidly secured in the box by a clamping screw 13. This clamping screw 13 also cooperates with an auxiliary cable clamp 14 and clamp and conductor bushing 15 to clamp the cable and conductors in position. The lower edge 15ª of the clamp and conductor bushing 15 engages the bottom of the partition 12 and thus aids in holding it rigidly in the box.

The partition 12 is best indicated in Fig. 2. The top of the partition is of U-shape. When the partition is mounted in position in an outlet box the side of the U-shaped top extends substantially to the top of the outlet box. The space between the sides of the U is provided for the portion of convenience outlet 11 which extends within the outlet box 10. The sides of the U are of such width that the inner edges seat in grooves provided at each side of the convenience outlet 11. In order that the partition may be used for outlet boxes of different depths portions are scored which may be removed depending upon the depth of the boxes for which the partition is to be used. The lower end of the partition is bent at right angles to the upper end and has an opening 16 through which the clamping screw 13 passes to secure the partition in position in the outlet box. The lower end of the partition has portions cut away at each side corresponding to the sides of the U-shaped top. Thus the partition may be cut from a flat strip of metal with the bottom of the partition extending within the top of an adjacent partition without any waste material between them.

While a double convenience outlet is shown in the drawing it is obvious that any wiring device might be substituted therefor and the partition used in conjunction therewith to separate the box into compartments to prevent any accidental connection of different circuits.

From the foregoing it may be seen that I have provided a partition which may be cut from a flat strip of metal leaving no waste material and which is adapted for use with different sizes of outlet boxes. Also, the partition substantially divides the outlet box into two compartments by filling the transverse space left between the convenience outlet and the sides of the outlet box. Movement of the partition within the outlet box is prevented by the clamping screw and cable clamp which secure it in position and the grooves at the sides of the convenience outlet which cooperate with the sides of the U-shaped top of the partition.

What I claim as new and desire to secure by Letters Patent of the United States, is:

1. In combination, an outlet box, a wiring device secured in said box, a partition separating said box into two compartments and having a U-shaped top with the sides of the U-engaging grooves in the sides of the wiring device, and means including a cable clamp to secure said partition in said box.

2. In combination, an outlet box, a wiring device secured in said box, a partition separating said box into two compartments and having a U-shaped top with the sides of the U engaging grooves in the sides of the wiring device, and a bottom bent at right angles to the top with sides cut away corresponding to the sides of the U-shaped top.

3. In combination, an outlet box, a wiring device secured in said box, a partition separating said box into two compartments and having a U-shaped top with the sides of the U engaging grooves in the sides of the wiring device, portions adjacent the top scored for easy removal, and a bottom bent at right angles to the top with the sides cut away corresponding to the sides of the U-shaped top and having an opening through which a clamping screw may pass to secure the partition in the outlet box.

GERHARD P. SCHWABACHER.